(12) United States Patent
Boppart et al.

(10) Patent No.: US 9,638,511 B2
(45) Date of Patent: May 2, 2017

(54) SMART PHONE ATTACHMENT FOR 3-D OPTICAL COHERENCE TOMOGRAPHY IMAGING

(71) Applicant: The Board of Trustees of the University of Illinois, Urbana, IL (US)

(72) Inventors: Stephen A. Boppart, Champaign, IL (US); Ryan L. Shelton, Champaign, IL (US); Nathan Shemonski, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 14/819,551

(22) Filed: Aug. 6, 2015

(65) Prior Publication Data

US 2016/0040978 A1 Feb. 11, 2016

Related U.S. Application Data

(60) Provisional application No. 62/034,898, filed on Aug. 8, 2014.

(51) Int. Cl.
*G01B 9/02* (2006.01)

(52) U.S. Cl.
CPC .............................. *G01B 9/02091* (2013.01)

(58) Field of Classification Search
CPC ............ G01B 9/02091; G01B 9/02051; G01B 9/02054; G02B 23/00
USPC .................................................. 356/479, 497
See application file for complete search history.

(56) References Cited

U.S. PATENT DOCUMENTS

| | | | |
|---|---|---|---|
| 6,396,587 B1 | 5/2002 | Knupfer et al. | 356/479 |
| 7,400,409 B2 | 7/2008 | Hauger et al. | 356/479 |
| 7,488,070 B2 | 2/2009 | Hauger et al. | 351/200 |
| 8,115,934 B2 | 2/2012 | Boppart et al. | 356/479 |
| 9,198,573 B2* | 12/2015 | Raymond | A61B 3/102 |
| 2012/0101390 A1* | 4/2012 | Iftimia | A61B 5/0035 600/476 |
| 2014/0285812 A1* | 9/2014 | Levitz | A61B 5/0066 356/479 |

(Continued)

OTHER PUBLICATIONS

Ahmad et al., "Cross-correlation-based image acquisition technique for manually-scanned optical coherence tomography," *Opt. Express*, vol. 17, No. 10, pp. 8125-8136 (May 2009).

(Continued)

*Primary Examiner* — Jonathan Hansen
(74) *Attorney, Agent, or Firm* — Sunstein Kann Murphy & Timbers LLP

(57) ABSTRACT

Methods and apparatus for tomographic imaging of a sample. Low-coherence light is split into a sample path and a reference path. A steering optic recombines light in the reference path with light scattered by a sample onto a camera having an areal focal plane array of detector elements such that light in the reference path and light scattered by the sample are characterized by respectively offset propagation vectors at incidence upon the camera. A processor derives depth information from light scattered by the sample on the basis of interference fringes between light in the reference path and light scattered by the sample. The apparatus tracks lateral motion and may be hand-held or attached to a mobile device such as a smartphone, thus enabling 3-D imaging with the mobile device.

26 Claims, 5 Drawing Sheets

(56) References Cited

U.S. PATENT DOCUMENTS

2016/0166194 A1\* 6/2016 Gareau ............... A61B 5/6898
600/328

OTHER PUBLICATIONS

Fercher et al., "Optical coherence tomography—principles and applications," *Rep. Prog. Phy.*, vol. 66, pp. 239-303 (2003).
Hauger et al., "Interferometer for optical coherence tomography," *Appl. Opt.*, vol. 42, No. 19, pp. 3896-3902 (Jul. 2003).
Shelton et al., "Optical coherence tomography for advanced screening in the primary care office," *J. Biophotonics*, pp. 1-9 (Apr. 2013).
Umetsu et al., "Non-Scanning Optical Coherence Tomography Using Off-Axis Interferometry with an Angular-Dispersion Imaging Scheme," *Opt. Rev.*, vol. 9, No. 2, pp. 70-74 (2002).
Zizka et al., "SpeckleSense: Fast, Precise, Low-cost and Compact Motion Sensing using Laser Speckle," UIST '11, 10 pages (Oct. 2011).

\* cited by examiner

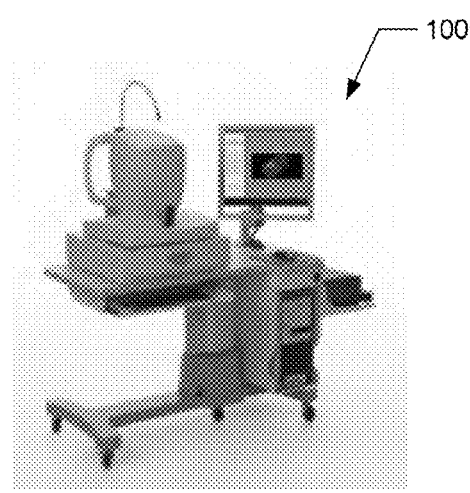
Fig. 1
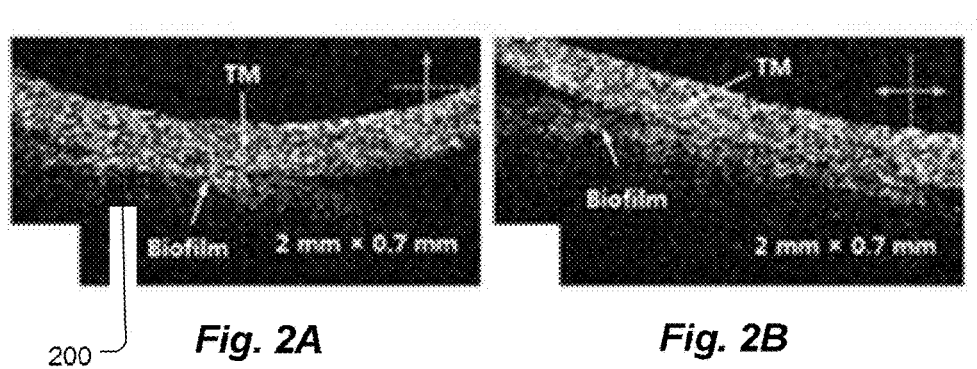
Fig. 2A  Fig. 2B
PRIOR ART

Fig. 4A
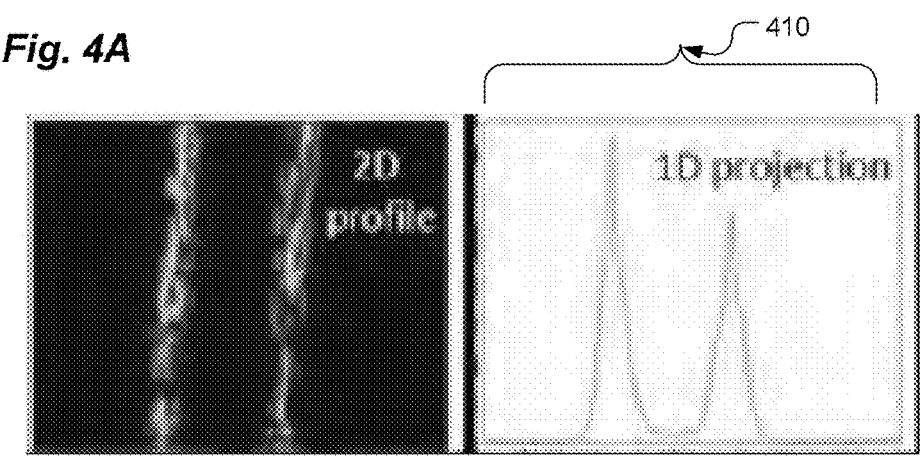
Fig. 4B
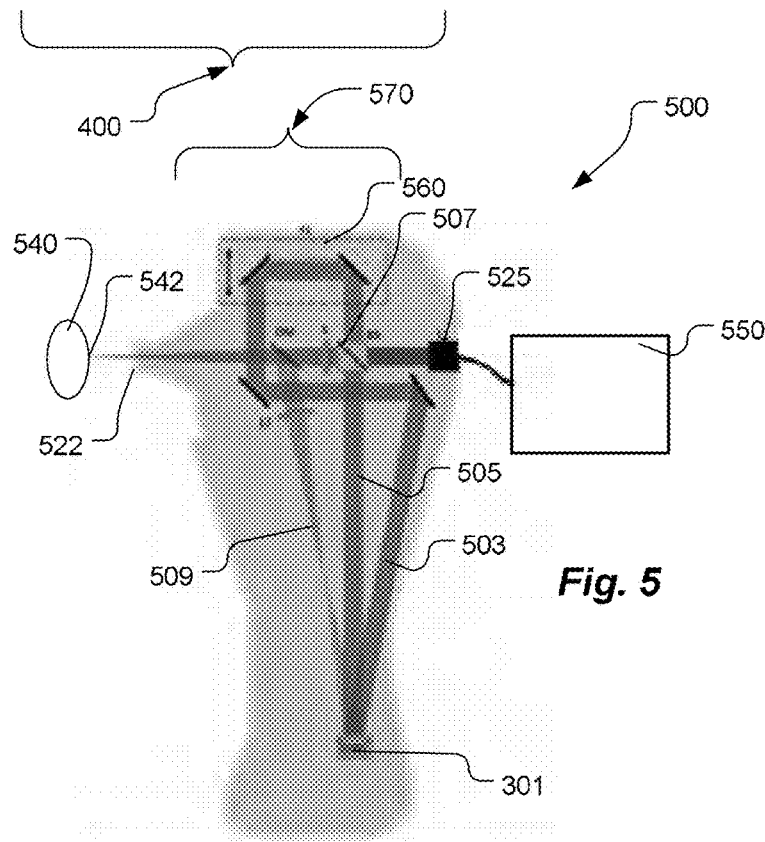
Fig. 5

SMART PHONE ATTACHMENT FOR 3-D OPTICAL COHERENCE TOMOGRAPHY IMAGING

The present application claims priority from U.S. Provisional Patent Application Ser. No. 62/034,898, filed Aug. 8, 2014, and incorporated herein by reference.

This invention was made with government support under Grant R01 EB013723, awarded by the National Institutes of Health, and Grant CBET14-45111, awarded by the National Science Foundation. The Government has certain rights in the invention.

TECHNICAL FIELD

The present invention relates to apparatus and methods for three-dimensional imaging, and, more particularly, to apparatus and methods for adapting a mobile device, such as a smart phone, by means of an attachment, to perform optical coherence tomography.

BACKGROUND ART

Optical coherence tomography (OCT) derives subsurface scattering information—amplitude, and/or phase, typically by temporal gating, or else by information obtained in the spectral domain, either by slewing the wavelength of a narrowband beam, or by dispersion of a broadband beam. OCT has manifold applications in many medical fields including ophthalmology, cardiology, oncology, otolaryngology, gastroenterology and dentistry, as well as in many non-medical applications such as materials imaging, non-destructive testing, quality control and coating measurements.

The use of a spatial interferogram to derive depth information, where the interferogram is created by interfering the scatter return from a sample with a reference beam derived from the illuminating source, has been described, for example, by Hauger et al., "*Interferometer for Optical Coherence Tomography,*" *Appl. Opt.*, vol. 42, pp. 3896-3902 (2003), (hereinafter, "Hauger (2003)") incorporated herein by reference. Hauger teaches a scatter return and a reference beam both coupled onto a linear CCD array via offset monomode optical fibers. The concept described by Hauger constitutes a particular instance of "Linear OCT." Hauger shows the proportionality of the signal-to-noise ratio (SNR) in Linear OCT to the same variables as those limiting SNR in time-domain OCT, assuming shot-noise-limited detection. Linear optical coherence tomography was first described by Hauger et al., "*High speed low coherence interferometer for optical coherence tomography,*" *SPIE Proc.* 4619, pp. 1-9 (2002), and by Umetsu et al., "Non-scanning optical coherence tomography by an angular dispersion imaging method," *Opt. Rev.*, vol. 9, pp. 70-74 (2002), both of which publications are incorporated herein by reference. Generally stated, a relative tilt introduced between the sample and reference beams creates interference fringes along one direction. Encoded in these fringes is the relative time-of-flight of photons between the sample and reference arms. This results in a pseudo time-domain OCT (TD-OCT) system, but with the advantage of no moving components. Umetsu, however, provides a grating for angular-dispersion demodulation of the interference pattern created by the tilt between sample and reference beams, constraining the applicability of such a technique to particular geometries.

OCT has typically required an OCT system 100, of which an example is shown in FIG. 1, sized at least on the scale of a desktop computer, and coupled to an optical probe by optical fibers, or otherwise. More recent advances have used optical fibers to couple compact portable instruments to a core imaging unit, as described, for example in Shelton et al., "*Optical coherence tomography for advanced screening in the primary care office,*" *J. Biophotonics*, DOI: 10.1002/jbio.201200243, (Apr. 18, 2013), hereinafter, "Shelton (2013)," and in U.S. Pat. No. 8,115,934 (to Boppart, "Boppart '934"), both of which are incorporated herein by reference. FIGS. 2A and 2B (FIGS. 4C and 4D in Shelton (2013)), show images of a tympanic membrane TM with an accompanying biofilm 200 derived from a patient with chronic otitis media with instrumentation as that described in the Boppart '934 patent.

Various applications would benefit from the availability of a three-dimensional (3-D) imaging capability that is readily hand-held and self-contained, and there is, therefore, a clear need for leveraging the resources of a mobile device, such as a smart phone, to achieve the benefits of 3-D imaging.

SUMMARY OF EMBODIMENTS OF THE INVENTION

In accordance with embodiments of the invention, apparatuses and methods are provided for tomographic imaging of a sample. In accordance with one embodiment of the invention, a system is provided that has a source of low-coherence light for emitting a low-coherence light beam and a first beam splitter for dividing the low-coherence light beam into a sample path and a reference path. The system also has a steering optic for recombining light in the reference path with light scattered by a sample, with no intervening dispersive element, onto a camera having an areal focal plane array of detector elements. The first beam splitter, the camera and the steering optic are disposed within a hand-held probe. A processor is coupled to receive signal input from the areal focal plane array of detector elements. Light in the reference path and light scattered by the sample are characterized by respectively offset propagation vectors at incidence upon the camera, and the processor is configured to derive depth information from light scattered by the sample on the basis of interference fringes between light in the reference path and light scattered by the sample.

In accordance with alternate embodiments of the invention, the steering optic may be a dichroic mirror. The source of low-coherence light may be disposed within the hand-held probe. The camera may include a planar sensor for generating an image signal.

In accordance with various embodiments of the present invention, the source of low-coherence light may be one of a superluminescent diode and a light-emitting diode. A dichroic mirror may be disposed within the sample path, to allow substantially contemporaneous acquisition of an image of the surface of the sample. The processor may be adapted to interleave images of a surface of the sample and a depth profile of the sample, and a distinct light source may be provided for illuminating the surface of the sample.

A cylindrical optic, such as a cylindrical reflector or lens, may be disposed within the sample path for focusing light in the sample path onto a line within the sample.

In accordance with another embodiment of the present invention, a 3-D imaging attachment is provided for a mobile device. The 3-D imaging attachment has an enclosure adapted for rigid attachment to the mobile device, a first beam splitter disposed within the enclosure, for dividing a low-coherence light beam into a sample path and a reference path, and a steering optic for recombining light in the reference path with light scattered by a sample onto a camera of the mobile device. A source of low-coherence light that emits the low-coherence light beam may either be contained within the enclosure or external to it. Light in the reference path and light scattered by the sample are characterized by respectively offset propagation vectors, in such a manner that depth information may be derived from light scattered by the sample on the basis of interference fringes between light in the reference path and light scattered by the sample.

In accordance with yet other embodiments of the present invention, the first beam splitter and the steering optic may comprise an identical component. The source of low-coherence light may be one of a superluminescent diode and a light-emitting diode. A dichroic mirror may be disposed within the sample path, and a cylindrical optic, such as a cylindrical reflector or lens, may be disposed within the sample path for focusing light in the sample path onto a line within the sample.

In accordance with a further aspect of the present invention, a method is provided for characterizing light scattering in a sample. The method has steps of:
a. generating a low-coherence light beam with a source disposed within an enclosure attached to a mobile device;
b. splitting a low-coherence light beam into light traversing a reference path and a sample path;
c. illuminating a sampled point on the sample with light from the sample path;
d. interfering light scattered by the sample with light traversing the reference path reference beam, such that the light scattered by the sample and the light traversing the reference path reference beam are incident upon a sensor, with no intervening dispersive element, at respectively offset angles of incidence such as to generate a fringe pattern characterized by a fringe direction on a sensor within the mobile device; and
e. digitally processing the fringe pattern by means of a processor to obtain an axial profile of scattering within the sample as a function of depth into the sample.

In yet further embodiments of the present invention, the step of digitally processing may be performed, at least in part, by a processor disposed within the mobile device. The step of illuminating the sampled point on the sample may include focusing the light from the sample path with a cylindrical optic in such a manner as to illuminate a line segment on the sample, or focusing the light from the sample path with a spherical optic in such a manner as to illuminate substantially one point on the sample. The step of digitally processing may include averaging over a dimension perpendicular to the fringe direction so as to obtain a profile of scattering as a function of depth into the sample.

In accordance with still further embodiments of the present invention, the method for characterizing light scattering in a sample may have further steps of:
f. storing the one-dimensional axial profile of scattering within the sample;
g. recording lateral motion of the mobile device; and
h. assembling axial profiles at a plurality of laterally displaced locations to obtain a two-dimensional or three-dimensional image of scattering within the sample.

In accordance with other embodiments of the present invention, the step of recording lateral motion may comprise coregistration of a visible surface image, or correlating a plurality of subsequent axial scans of scattering within the sample to identify motion of the sampled point on the sample, or any form of speckle tracking, including analyzing speckle in a surface image of the sample.

BRIEF DESCRIPTION OF THE DRAWINGS

The present patent or application file contains at least one drawing executed in color. Copies of this patent with color drawing(s) will be provided by the Patent and Trademark Office upon request and payment of any necessary fee.

The foregoing features of the invention will be more readily understood by reference to the following detailed description, taken with reference to the accompanying drawings, in which:

FIG. 1 depicts a prior art desktop OCT imaging system.

FIGS. 2A and 2B show prior art OCT images of the tympanic membrane and associated biofilm within the middle ear of a patient.

FIG. 4A shows a two-dimensional interference pattern obtained in OCT imaging of a swine eardrum in accordance with an embodiment of the present invention; FIG. 4B is a one-dimensional projection of the interferogram of FIG. 4A, corresponding to scatter intensity in the sample as a function of depth.

FIG. 5 is a schematic depiction of an OCT imaging system in accordance with an embodiment of the present invention, as adapted for implementation within an otoscope form factor.

DETAILED DESCRIPTION OF EMBODIMENTS OF THE INVENTION

Definitions

Figure 3:
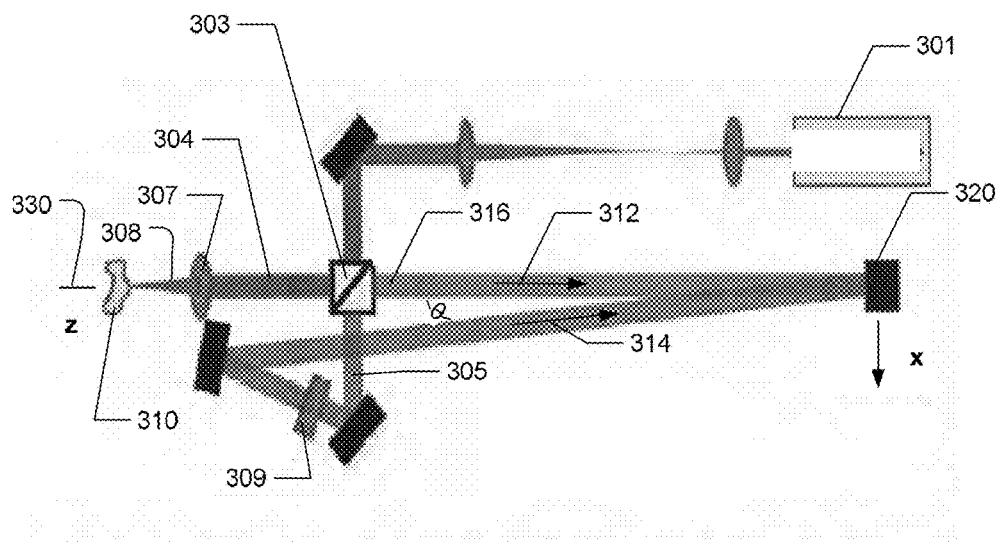
FIG. 3 is a schematic depiction of an OCT imaging system in accordance with an embodiment of the present invention.

The term "image" shall refer to any multidimensional representation, whether in tangible or otherwise perceptible form, or otherwise, whereby a value of some characteristic (amplitude, phase, etc.) is associated with each of a plurality of locations corresponding to dimensional coordinates of an object in physical space, though not necessarily mapped one-to-one thereon. Thus, for example, the graphic display of the spatial distribution of some field, either scalar or vectorial, such as brightness or color, constitutes an image. So, also, does an array of numbers, such as a 3D holographic dataset, in a computer memory or holographic medium. Similarly, "imaging" refers to the rendering of a stated physical characteristic in terms of one or more images.

The term "mobile device," as used herein and in any appended claim, shall refer to a member of the class of consumer products that includes computing devices small enough to be hand-held, having, at least, a display screen with touch input and/or a miniature keyboard, and an on-board camera. The term "mobile device" shall encompass smart phones, tablets, phablets, etc., without limitation.

For purposes of the foregoing definition, the term "computing device" shall refer to any device that may be programmed to carry out a set of logical operations automatically. It may be amenable to connection to a network, or not, within the scope of the present invention.

The term "camera," as used herein, shall refer to a device adapted to image a scene onto a sensor and to convert an optical image into an electrical signal. The sensor is a component of the "camera," as a matter of definition, for purposes of the present description and any appended claims.

The term "propagation vector" shall denote a unit vector pointed in the direction of propagation of an electromagnetic wave.

The terms "object," "sample," and "specimen" shall refer, interchangeably, to a tangible, non-transitory physical object capable of being rendered as an image.

When used to modify terms such as "beam," "pulse," etc., the terms "sample" and "signal" are used herein interchangeably.

The term "scattering medium," as used herein and in any appended claim, shall mean a medium in which an incident electromagnetic wave, of a wavelength range pertinent to the context under discussion, shall be characterized by a mean free path to scatter that is substantially shorter than the dimension of the medium in the propagation direction of the incident electromagnetic wave.

The term "scattering biological tissue," as used herein and in any appended claim, shall mean an organized ensemble of interconnected cells of an organism that has the optical properties associated with a scattering medium, as defined above.

The term "low-coherence" (or "broadband," as used interchangeably herein) applies to a source of illumination for which the coherence length is shorter than 30 µm, and/or for which $\Delta k/k_0$ is at least 10%, with $k_0$ denoting the central wavenumber of the spectrum illuminating the sample, while $\Delta k$ denotes the range of illuminating wavenumbers. It is to be understood that, within the scope of the present invention, the wavelength of the source need not be fixed in time, indeed, the wavelength of the source may be swept in time.

The term "point" as used in the context of a focal region of an optical system refers to a region defined by the point spread function of that optical system.

"Linear OCT" is defined as referring to embodiments of optical coherence tomography wherein depth is derived from a one-dimensional interference pattern in a focal plane obtained between a reference beam and a scatter signal obtained from a sampled region.

"Demodulation" shall refer to the process of analyzing a fringe pattern to infer the relative phase structure of two interfering waves.

Analyzing an Interferogram Between Two Beams Obliquely Focused in a Plane

In accordance with embodiments of the present invention, now described with reference to FIG. 3, light derived from a low-coherence source 301, such as a superluminescent diode (SLD), for example, is split by beam splitter 303 into a sample beam 304 and a reference beam 305. Sample beam 304 is focused by focal optics 307 onto sample 310. Light scattered by sample 310 is directed toward photodetector array 320 in a direction 312 substantially normal to photodetector array 320, while reference beam 305 is directed toward photodetector array 320 in a direction 314 that is oblique to the normal to photodetector array 320, and thus at an angle θ relative to scattered beam 316. An optic such as mirror 315 that directs either of the reference beam or the sample beam onto photodetector array 320 will be referred to herein as a "steering optic" 315. In certain embodiments, such as the embodiment described below with reference to FIG. 5, a beamsplitter, such as beamsplitter 303, may serve as the steering optic 315. Alternatively, a second beamsplitter, or a dichroic mirror DM2 (shown in FIG. 6) may serve as the steering optic 315.

Photodetector array 320 is a two-dimensional array of detector elements, and is typically a CCD or CMOS, although any two-dimensional detector array is within the scope of the present invention. Reference beam 305 may propagate through a medium, such as glass 309, having an index of refraction selected so as to ensure that scatter beam 316 (also referred to herein as "scattered light") and reference beam 305 interfere coherently at photodector array 320.

Since scatter beam 316 and reference beam 305 are coherent, albeit over a short coherence length, and incident on photodetector array 320 at different angles, spatial interference fringes are created in the plane of the page, here, in a transverse direction denoted $\hat{x}$. The axial depth $\Delta l$ (relative to a fiducial zero pathlength difference) from which scattered light 316, along the $\hat{z}$ axis 330 emanates is readily derived by demodulation of the interferogram, since considering all sample material illuminated by a wavefront at a given depth z as a single "point" for purposes of analysis (i.e., neglecting the transverse profile of the illuminating beam), gives rise to an ac component of the signal current that varies with x as $\cos(k\theta x - \Delta l)$. Thus, each scattering depth results in an interference burst with a Gaussian envelope along one direction, and these interference bursts may be readily demodulated to yield a scattering profile as a function of depth into the sample. Demodulation of the interference pattern proceeds as described in Fercher et al., "Optical coherence tomography—principles and applications," Rep. Prog. Phys., vol. 66, pp. 239-303 (2003), incorporated herein by reference. The role of relative time delay is played by a function of x.

In accordance with embodiment of the present invention, photodetector array 320 is an areal (two-dimensional, 2-D) array. Photodetector array 320 may also be referred to herein as a "planar sensor." An advantageous improvement in signal-to-noise provided by demodulation of a spatial interferogram in two dimensions allows for clinical applications that would not otherwise have been possible due to patient movement and biological processes. An interference pattern formed by the interference of a scatter beam 316 and the reference beam 305 in the plane of photodetector array 320 is shown in FIG. 4A where it is designated generally by numeral 400. Interference pattern 400 was obtained by imaging an ex vivo swine eardrum using methods of the present invention.

A two-dimensional interferogram 400 is obtained based on an intensity signal in the focal plane of 2-D photodetector array 320, referred to herein as the "image signal." Once the image signal has been obtained, various algorithms may be employed, within the scope of the present invention, for deriving a depth profile of scattering from a two-dimensional interferogram. The simplest of those entails averaging across the dimension $\hat{y}$ transverse to the direction of relative tilt between the scatter beam 316 and the reference beam 305.

While various geometries suggest themselves to a person of ordinary skill in the art, any focusing geometry falls within the scope of the present invention, since the transfer function $\Phi(r, z_0)$ can, in principle, always be calculated for a point scatterer at $z_0$.

Solution of the measured interferogram I (r) to yield $\chi(z)$ is an inverse scattering problem that proceeds, by successive iterations, beginning at the locus of positions on the plane of photodetector array 320 that correspond to the midpoint of a two-dimensional interference burst due to a point scatterer at the disk z=0 where probe beam 308 is incident on surface 311 of sample 310. A one-dimensional projection 410, shown in FIG. 4B, of the 2-D interferogram 400 yields a significantly improved signal-to-noise over any that may be obtained using a linear detector array as in the prior art. The derivation of scatter signal (or susceptibility) along one linear dimension (referred to as "axial") as a function of z will be referred to herein, in keeping with the terminology of OCT practice, as an "A-scan."

Deriving Axial Scattering Data Using a Hand-Held Device with an Area Photodetector for Acquiring an Interferogram Between Two Beams Obliquely Focused in a Plane Referring now to FIG. 5, in accordance with embodiments of the present invention, the use of a 2-D detector, as taught herein, uniquely enables a hand-held 3-D optical imaging platform, designated generally by numeral 500. Hand-held 3-D optical imaging platform 500 may also be referred to herein as a "hand-held device," a "hand-held probe," or, as a matter of heuristic convenience, a "hand-held otoscope." Hand-held otoscope 500 contains an OCT interferometer 570 as described above. Otoscopic tip 522 is adapted for insertion into an ear canal, typically of a person. A sample beam 530, derived from low-coherence light source 301, is split into reference beam 503 and probe beam 505, the latter of which is directed to sample 540 via beam splitter 507 and focused onto the sample. The scatter from sample 540 and the reference beam 503, as reflected by beam splitter 507, are incident upon camera 525 at differing angles of incidence. Camera 525 may also be referred to herein as a photodetector, although it is to be understood that camera 525 may additionally include other optical components such as one or more lenses within the scope of the present invention. Camera 525 preferably includes a compact consumer-grade 2D photodetector array, which is typically smaller, by a factor of 5-10×, than linear cameras that have been employed in prior implementations of linear OCT.

Combination of the reference and scatter beams at camera 525 at differing angles of incidence creates a two-dimensional interferogram from which scattering as a function of depth, or susceptibility of the sample as function of depth, may be derived using processor 550 coupled electrically or wirelessly to receive a signal from camera 525. An additional surface probe beam 509, derived from source 301, may be directed to surface 542 of sample 540 with surface scattering directed to photodetector 525 for purposes of generating a surface image. Insofar as operation of the present invention is described in terms of imaging tissue, surface 542 may be referred to herein as a "tissue surface." The surface image and the interferogram described above may be observed in quick succession, providing simultaneous access to both surface and depth-resolved images with a single photodetector.

Advantages that may be achieved by virtue of employing a two-dimensional photodetector array as a component of camera 525 include, prominently, the reduction of speckle, through averaging of spatial pixels along the dimension ($\hat{y}$) transverse to the direction ($\hat{x}$) of tilt between the sample and reference beams, and an increase in dynamic range due to the signal being spread across millions of pixels instead of 1000-2000 pixels (as in the case of a linear array). Dynamic range is very important in OCT due to the extreme dynamic range between reflections obtained from simultaneous surface and subsurface reflections.

In the embodiment of FIG. 5, the hand-held 3-D optical imaging platform 500 has a small translation stage 560 to quickly and easily adjust the path length difference between the reference and sample beams and a dichroic mirror DM to allow simultaneous visualization of the surface 542 of the eardrum, or other sample 540. Unlike previous low-coherence interferometry depth profiling implementations for middle ear analysis, the present invention advantageously requires no external optics or hardware. OCT interferometer 570 and photodetector 525 are all integrated into the hand-held device 500. Depending on the light source 301 used (SLD vs. LED vs. halogen lamp), the light source 301 may be a light source that is distinct from the low-coherence source 301 used to penetrate the sample and to obtain a depth profile of the sample, and may either be integrated into the hand-held probe 500 or else light may be disposed within an external enclosure and coupled to hand-held probe 500 via optical fiber. Significantly, the embodiment of the invention depicted in FIG. 5 may advantageously allow for simultaneous viewing of a surface video image and a depth profile simply by synchronizing the illumination for each image to the frame rate of the camera. Alternating between video image and depth profile with each exposure time would provide real-time display of both images.

Figure 6:
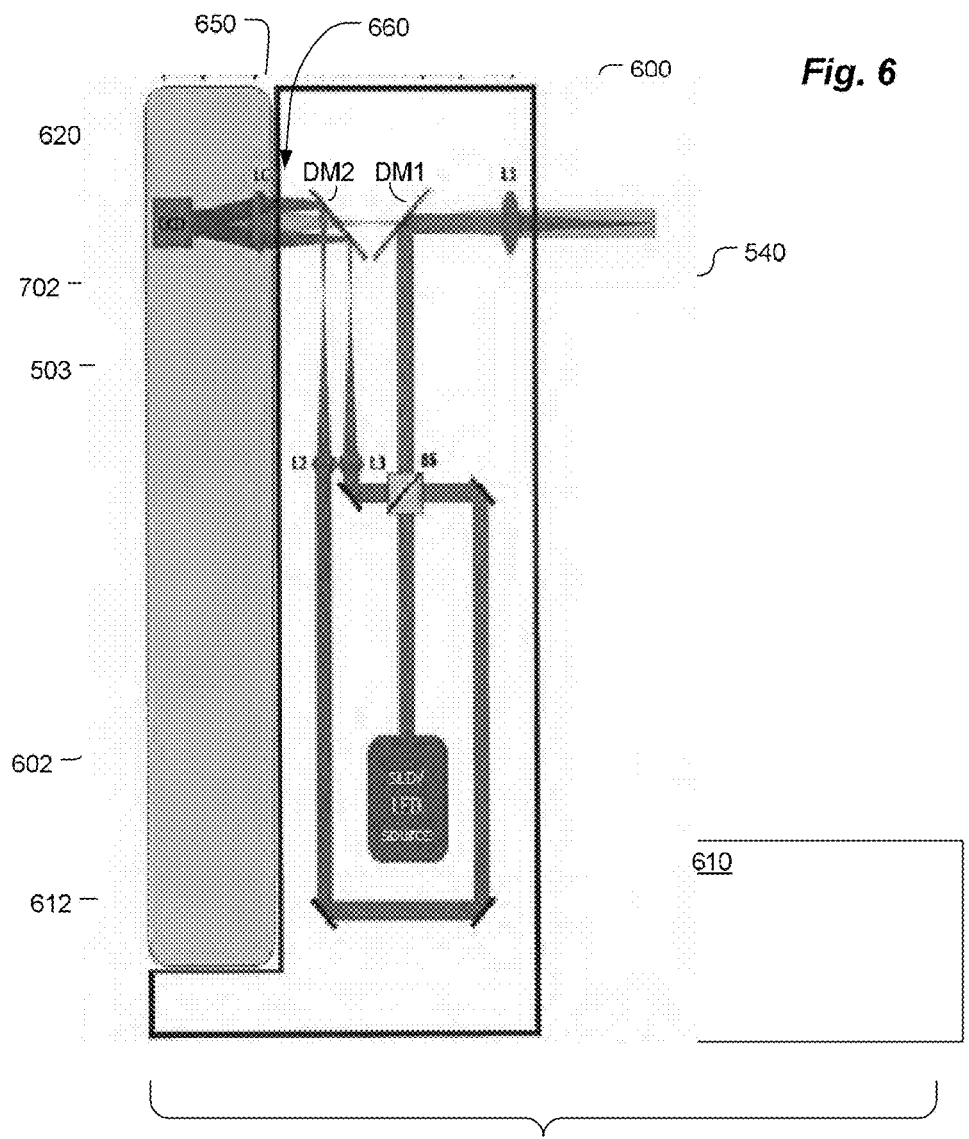
FIG. 6 is a schematic depiction of an OCT imaging system in accordance with an embodiment of the present invention, as adapted for docking, and operation in conjunction with, a smartphone.
Figure 7:
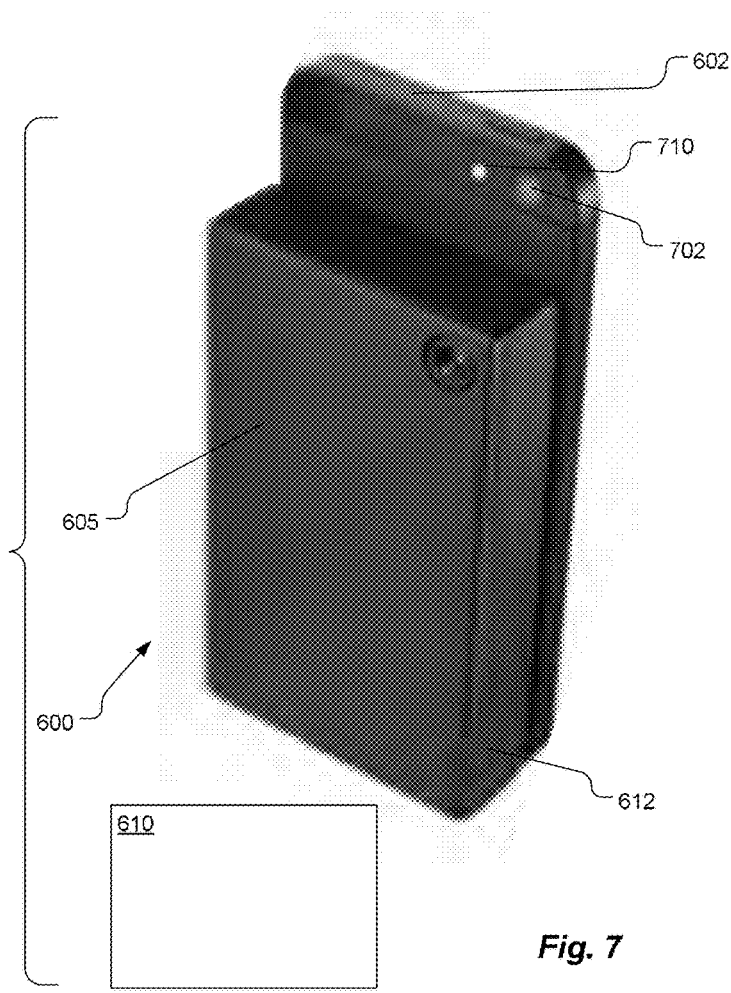
FIG. 7 is a perspective view of an OCT attachment with a docked smartphone, in accordance with an embodiment of the present invention.

Deriving Depth Scattering Data by Using a Smartphone Camera for Acquiring an Interferogram Between Two Beams Obliquely Focused in a Plane In FIG. 6, a schematic is shown, in cross section, of a tomographic imager, designated generally by numeral 600, adapted for integration with a mobile device 602 such as the smartphone shown by way of example. Tomographic imager 600 may also be referred to herein as a "3D imaging platform," and as an "OCT attachment" for a mobile device. The additional optics supplied in order to provide mobile device 602 with a 3-D image capability are enclosed within casing 610 which includes a dock 612 for engaging mobile device 602. Casing 610 may also be referred to herein as an "enclosure." Mobile device 602 is shown in the process of engagement by casing 605 of OCT attachment 600 in perspective view in FIG. 7. In FIG. 7, smart phone camera 702 is exposed for standard photos, and is slid into the dock for 2D or 3D optical imaging.

In the embodiment depicted in FIG. 6, light from source 301 is split by beamsplitter BS into reference beam 503 and probe beam 505, and probe beam 505 is focused onto sample 540, by lens L1, for example, as further discussed below.

Dichroic mirrors DM1 and DM2 allow reference beam 503 and sample beam 605 to be focused, by lenses L2 and L3, respectively, onto photodector array 620 at different angles of incidence by virtue of offset incidence onto the entrance lens 650 of camera 702 of the smartphone (or other mobile device) 620. Additionally, front surface 542 of sample 540 may be imaged onto the focal plane of photodetector array 620 to obtain a two-dimensional image concurrently with a depth profile obtained by OCT in accordance with the teachings above. Illumination of the front surface 542 of sample 540 may be achieved by surface-mount LEDs arranged around the aperture of the dock 512 to illuminate the tissue surface 542. Alternatively, a white LED 710 (shown in FIG. 7) typically present in smartphone 602 may be utilized by employing a short fiber bundle (not shown) to couple light from LED 710 to illuminate tissue surface 542.

In preferred embodiments of the present invention, infrared light at approximately 800 nm is used for the OCT imaging, or, alternatively, the longest wavelength allowed by optics of the mobile device 620.

Within the scope of the present invention, the scattering depth profile 410 (shown in FIG. 4) may be computed, as described above, using either internal computing resources of mobile device 602 or by wireless communication with an external processor 610, or a by a combination of internal and external processing resources.

While lens L1 is a spherical lens in one embodiment, replacing L1 with a cylindrical lens advantageously allows for 2D cross-sectional imaging with no other changes to the system hardware. The result of replacing L1 with a cylindrical lens is to trade signal-to-noise ratio (SNR) for additional spatial information from the sample 540. As seen in the 2D profile of the swine ear drum in FIG. 4A, the SNR is high enough to enable useful imaging of biological tissue even without averaging the vertical axis of the sensor. Full cross-sectional imaging advantageously opens up many more applications in both the medical and non-destructive evaluation industries.

In cases where a cylindrical lens is used as L1, then the surface image path is preferably separated from the OCT imaging path at aperture 660 of dock 612 in order to avoid taking surface images through the cylindrical lens. The processing and display of the tissue surface and OCT images are preferably integrated within the smartphone 602 using processing resources of the smartphone 602 that are used to initiate scans and save images.

Generation of cross-sectional 2D images or 3D volumes has traditionally required a lateral scanning mechanism, such as galvanometer-mounted mirrors or physical translation of an optical fiber or of the sample. However, any technique for assembly of depth scans performed at different transverse positions is within the scope of the present invention, and allows for convenient implementation on a smart phone or other mobile device. OCT image assembly may be based, for example, on the acquired A-scan data and the (de)correlation of the data when the sample or instrument is moved, as described in detail in Ahmad. A. et al., "Cross-correlation-based image acquisition technique for manually-scanned optical coherence tomography," *Opt. Expr.*, vol. 17, pp. 8125-36 (2009) (hereinafter, "Ahmad (2009)"), which is incorporated herein by reference. The algorithm of Ahmad (2009) advantageously replaces mechanical scanning with free-hand lateral scanning of the beam delivery instrument or device by the user. Another modality that may be employed, within the scope of the present invention, is that used by an optical computer mouse that employs speckle tracking on a surface to record the lateral movement of the mouse, as described in Zizka J. et al., "SpeckleSense: Fast, precise, low-cost and compact motion sensing using laser speckle," *ACM UIST* (*User Interface Software and Technology*) *Symposium Proceedings*, pp. 489-98, (2011), incorporated herein by reference. Thus, in the context of the present invention, captured A-scan data is recording and analyzing the in real-time, and speckle tracking from the imaged surface is used to record the direction and velocity of the moving smartphone 602 as it is scanned across tissue 540.

In accordance with an embodiment of the invention, an empty 3D array exists in the smartphone memory and displayed as an empty 3D wireframe on the smartphone display. As the smartphone 602, docked to 3D imaging platform 600, is laterally scanned across the skin of a person or other sample 540, acquired data are used to "color-in" an area of skin for imaging, and the 3D wireframe is dynamically updated on the display, acquiring a 3D volume of high-resolution depth-resolved data that can subsequently be analyzed by a processor 610 on the mobile device 602 or externally.

While embodiments of the present invention have been described herein, by way of example, in terms of imaging of the eardrum, many other applications are enabled within the scope of the present invention. Other medical applications include profilometry of the cornea or interrogation of the oral cavity for screening of oral lesions or tooth decay. One advantage of this technique is its low cost, which makes it accessible to a large number of new applications, including introduction as a consumer device.

In accordance with certain embodiments of the present invention, aspects of OCT imaging described herein may be implemented as a computer program product for use with a computer system. Such implementations may include a series of computer instructions fixed either on a tangible medium, which is preferably non-transient and substantially immutable, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

The embodiments of the invention described above are intended to be merely exemplary; numerous variations and modifications will be apparent to those skilled in the art. All such variations and modifications are intended to be within the scope of the present invention as defined in any appended claims.

We claim:

1. A tomographic imaging system comprising:
 a. a source of low-coherence light for emitting a low-coherence light beam;
 b. a first beam splitter for dividing the low-coherence light beam into sample path and a reference path;
 c. a steering optic for recombining light in the reference path with light scattered by a sample along a path containing only a single point on a surface of the sample, with no intervening dispersive element, onto an entire area of an areal focal plane array of detector elements of a camera each detector element characterized by a dynamic range,
 wherein the first beam splitter, the camera and the steering optic are disposed within a hand-held probe; and
 d. a processor coupled to receive signal input from the areal focal plane array of detector elements,
 wherein light in the reference path and light scattered by the sample along the path containing only the single point on the surface of the sample are characterized by respectively offset propagation vectors at incidence upon the camera;

wherein the processor is configured to derive depth information from light scattered by the sample along the path containing only the single point on the surface of the sample on the basis of interference fringes between light in the reference path and light scattered by the sample; and wherein a signal dynamic range exceeds the dynamic range of each detector element.

2. The tomographic imaging system in accordance with claim 1, wherein the steering optic is a dichroic mirror.

3. The tomographic imaging system in accordance with claim 1, wherein the source is disposed within the hand-held probe.

4. The tomographic imaging system in accordance with claim 1, wherein the camera includes a planar sensor for generating an image signal.

5. The tomographic imaging system in accordance with claim 1, wherein the source of low-coherence light is one of a superluminescent diode and a light-emitting diode.

6. The tomographic imaging system in accordance with claim 1, further comprising a dichroic mirror disposed within the sample path.

7. The tomographic imaging system in accordance with claim 6, wherein the processor is adapted to interleave images of a surface of the sample and a depth profile of the sample.

8. The tomographic imaging system in accordance with claim 7, further comprising a distinct light source for illuminating the surface of the sample.

9. The tomographic imaging system in accordance with claim 1, further comprising a cylindrical optic disposed within the sample path for focusing light in the sample path onto a line within the sample.

10. The tomographic imaging system in accordance with claim 9, wherein the cylindrical optic is one of a cylindrical reflector and a cylindrical lens.

11. A 3-D imaging attachment for a mobile device, the 3-D imaging attachment comprising:
   a. an enclosure adapted for rigid attachment to the mobile device;
   b. a source of low-coherence light contained within the enclosure for emitting a low-coherence light beam;
   c. a first beam splitter for dividing the low-coherence light beam into a sample path and a reference path;
   d. a steering optic for recombining light in the reference path with light scattered by a sample along a path containing only a single point on a surface of the sample onto an entire area of an areal focal plane array of detector elements of a camera of the mobile device, each detector element characterized by a dynamic range;
   wherein light in the reference path and light scattered by the sample along the path containing only the single point on the surface of the sample are characterized by respectively offset propagation vectors, in such a manner that depth information may be derived from light scattered by the sample along the path containing only the single point on the surface of the sample on the basis of interference fringes between light in the reference path and light scattered by the sample; and
   wherein a signal dynamic range exceeds the dynamic range of each detector element.

12. The 3-D imaging attachment in accordance with claim 11, wherein the first beam splitter and the steering optic comprise an identical component.

13. The 3-D imaging attachment in accordance with claim 11, wherein the source of low-coherence light is one of a superluminescent diode and a light-emitting diode.

14. The 3-D imaging attachment in accordance with claim 11, further comprising a dichroic mirror disposed within the sample path.

15. The 3-D imaging attachment in accordance with claim 11, further comprising a cylindrical optic disposed within the unguided sample path for focusing light in the sample path onto a line within the sample.

16. The 3-D imaging attachment in accordance with claim 15, wherein the cylindrical optic is one of a cylindrical reflector and a cylindrical lens.

17. A method for characterizing light scattering in a sample, the method comprising:
   a. generating a low-coherence light beam with a source disposed within an enclosure attached to a mobile device;
   b. splitting a low-coherence light beam into light traversing a reference path and a sample path;
   c. illuminating a sampled point on the sample with light from the sample path;
   d. interfering light scattered by the sample along a path containing the sampled point with light traversing the reference path, such that the light scattered by the sample along the path containing the sampled point and the light traversing the reference path are incident, with no intervening dispersive element, upon an areal sensor of the mobile device at respectively offset angles of incidence such as to generate a fringe pattern characterized by a fringe direction on the sensor, the sensor comprising an areal array of detector elements, each detector element characterized by a dynamic range; and
   e. digitally processing the fringe pattern by means of a processor to obtain a one-dimensional axial profile of scattering within the sample as a function of depth into the sample along the path containing the sampled point, in such a manner that a signal dynamic range exceeds the dynamic range of each detector element.

18. The method in accordance with claim 17, wherein within the step of digitally processing is performed, at least in part, by a processor disposed within the mobile device.

19. The method in accordance with claim 17, wherein the step of illuminating the sampled point on the sample includes focusing the light from the sample path with a cylindrical optic in such a manner as to illuminate a line segment on the sample.

20. The method in accordance with claim 17, wherein the step of illuminating the sampled point on the sample includes focusing the light from the sample path with a spherical optic in such a manner as to illuminate substantially one point on the sample.

21. The method in accordance with claim 17, wherein the step of digitally processing includes averaging over a dimension perpendicular to the fringe direction so as to obtain a profile of scattering as a function of depth into the sample.

22. The method in accordance with claim 17, further comprising:
   f. storing the one-dimensional axial profile of scattering within the sample;
   g. recording lateral motion of the mobile device; and
   h. assembling axial profiles at a plurality of laterally displaced locations to obtain a two-dimensional or three-dimensional image of scattering within the sample.

23. The method in accordance with claim 22, wherein recording lateral motion comprises coregistration of a visible surface image.

24. The method in accordance with claim 22, wherein recording lateral motion comprises correlating a plurality of subsequent axial scans of scattering within the sample to identify motion of the sampled point on the sample.

25. The method in accordance with claim 22, wherein recording lateral motion comprises speckle tracking.

26. The method in accordance with claim 25, wherein speckle tracking includes analyzing speckle within an image of a surface of the sample.

* * * * *